United States Patent
Augu et al.

(10) Patent No.: US 8,694,786 B2
(45) Date of Patent: Apr. 8, 2014

(54) VIRTUAL MACHINE IMAGES ENCRYPTION USING TRUSTED COMPUTING GROUP SEALING

(75) Inventors: Rajiv Augu, Sao Paulo (BR); Steven A. Bade, Georgetown, TX (US); Jeb R Linton, Manassas, VA (US); Dimitrios Pendarakis, Westport, CT (US); George C. Wilson, Austin, TX (US); Lee Hardy Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 13/252,713

(22) Filed: Oct. 4, 2011

(65) Prior Publication Data

US 2013/0086383 A1  Apr. 4, 2013

(51) Int. Cl.
*H04L 9/08* (2006.01)

(52) U.S. Cl.
USPC ........... 713/171; 713/164; 713/168; 713/176; 713/189; 380/47; 380/227; 705/65; 705/69

(58) Field of Classification Search
USPC ........... 713/164–168, 171, 176; 380/47, 227; 705/65–69
See application file for complete search history.

(56) References Cited

U.S. PATENT DOCUMENTS

| | | | |
|---|---|---|---|
| 7,836,299 B2 | 11/2010 | England et al. | |
| 8,306,920 B1* | 11/2012 | Lynch | 705/71 |
| 2005/0120219 A1* | 6/2005 | Munetoh et al. | 713/176 |
| 2007/0226505 A1* | 9/2007 | Brickell | 713/176 |
| 2008/0046581 A1* | 2/2008 | Molina et al. | 709/229 |
| 2008/0109889 A1* | 5/2008 | Bartels | 726/7 |
| 2008/0244292 A1 | 10/2008 | Kumar et al. | |
| 2008/0244569 A1 | 10/2008 | Challener et al. | |
| 2008/0320308 A1* | 12/2008 | Kostiainen et al. | 713/171 |
| 2009/0089860 A1* | 4/2009 | Forrester et al. | 726/3 |
| 2009/0154709 A1 | 6/2009 | Ellison | |
| 2010/0011210 A1 | 1/2010 | Scarlata | |
| 2010/0082991 A1 | 4/2010 | Baldwin et al. | |
| 2010/0115261 A1 | 5/2010 | Annicchiarico et al. | |
| 2010/0115625 A1 | 5/2010 | Proudler | |
| 2010/0281273 A1 | 11/2010 | Lee et al. | |
| 2011/0314298 A1* | 12/2011 | Zimmer et al. | 713/189 |
| 2012/0089980 A1* | 4/2012 | Sharp et al. | 718/1 |

OTHER PUBLICATIONS

Yaping, et al; An Improved Sealing Scheme for Trusted Storage; Bejing Electronic Science and Technology Institute; BeiJing China; Dec. 11, 2009.

(Continued)

*Primary Examiner* — Yin-Chen Shaw
*Assistant Examiner* — Fahimeh Mohammadi
(74) *Attorney, Agent, or Firm* — David Mims; Robert C. Rolnik

(57) ABSTRACT

A host machine provisions a virtual machine from a catalog of stock virtual machines. The host machine instantiates the virtual machine. The host machine configures the virtual machine, based on customer inputs, to form a customer's configured virtual machine. The host machine creates an image from the customer's configured virtual machine. The host machine unwraps a sealed customer's symmetric key to form a customer's symmetric key. The host machine encrypts the customer's configured virtual machine with the customer's symmetric key to form an encrypted configured virtual machine. The host machine stores the encrypted configured virtual machine to non-volatile storage.

13 Claims, 5 Drawing Sheets

(56) References Cited

OTHER PUBLICATIONS

Wang, et al; A Hypervisor-based Secure Storage Scheme; nswctc, vol. 1, pp. 81-86, 2010 Second International Conference on Networks Security, Wireless Communications and Trusted.

Lenovo; Creating Linkage Between a Hypervisor's TPM reporting and its Supported VM Virtual TPM Reporting; IPCOM000147479D; Mar. 16, 2007.

Suga, "A Low-Cost Key Derivation Scheme for Hierarchy-Based Access," nbis, pp. 564-568, 2010 13th International Conference on Network-Based Information Systems, 2010.

W.G. Tzeng, "A Time-Bound Cryptographic Key Assignment Scheme for Access Control in a Hierarchy," IEEE Transactions on Knowledge and Data Engineering, vol. 14, No. 1, pp. 182-, Jan./Feb. 2002.

Stumpf;Enhancing Trusted Platform Modules with Hardware-Based Virtualization Techniques. In Securware(2008) 1-9.

* cited by examiner

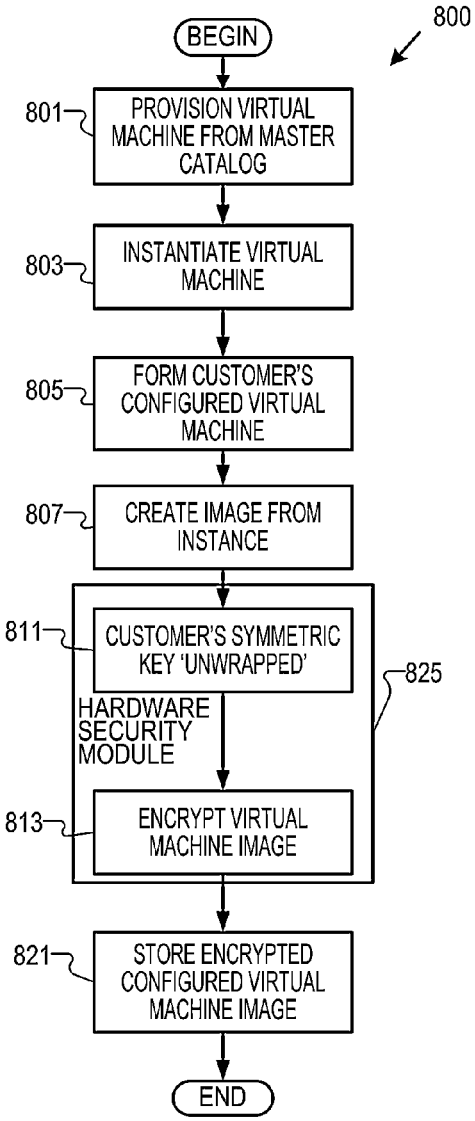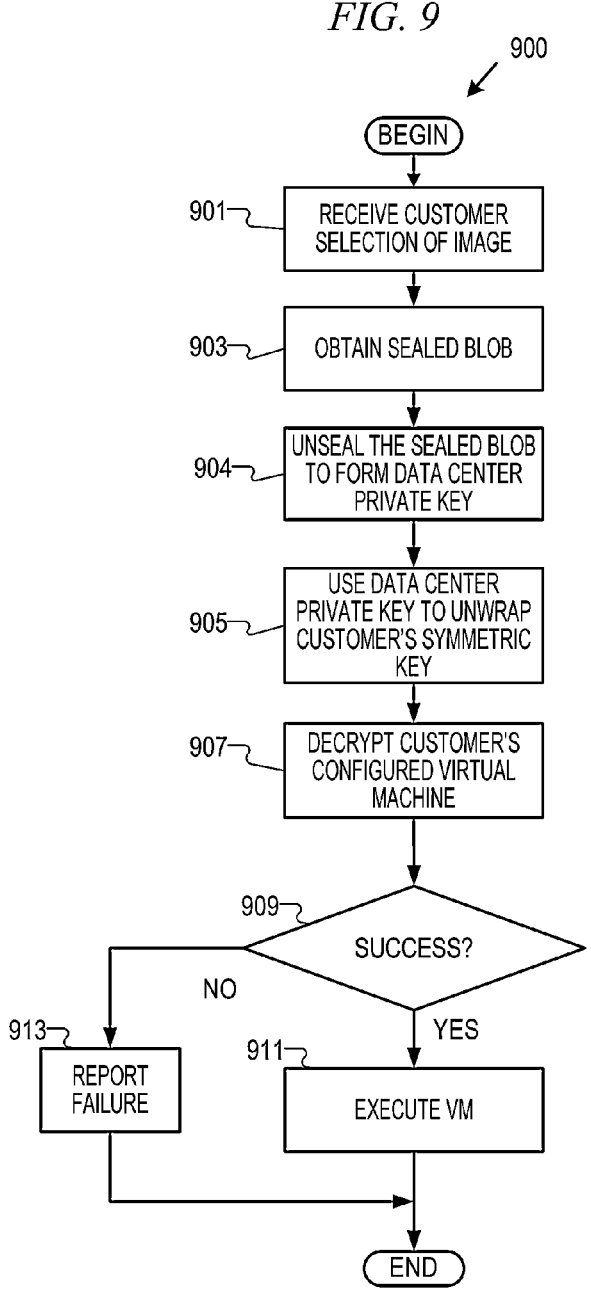

VIRTUAL MACHINE IMAGES ENCRYPTION USING TRUSTED COMPUTING GROUP SEALING

BACKGROUND

The present invention relates generally to a computer implemented method, data processing system, and computer program product for data security. More specifically, the present invention relates to securing images and other stored program data and/or underlying system state of host machines. Modern data centers offer a growing ability to form a division of labor between those who maintain the physical equipment and those who configure the physical equipment as nodes to balance loads of incoming processing work. In other words, data center operators' work has become more distinct from the work and goals of their customers, who in effect, rent disk space, processing power, and network interconnectivity in a manner that permits easy scaling to respond to rapidly changing market forces. As such, these systems and the relationship between data center operator and customer permit greater utilization of the resources of the data center and more responsiveness to scaling demand.

A data center is a shared pool of configurable computing resources. A data center is operated by a data center operator, which although may be a single person, can be an organization of many employees, whose function is to obtain and secure a suitable environment within correct tolerances of heat, humidity, dust and the like for the operation of many computer system servers. In addition, the data center operator procures, installs, and repairs the physical equipment, as well as installs and maintains hosting software, for example, hypervisors, to each processor. Further, the data center operator may obtain service level agreements to assure appropriate network speeds are available and backups are performed as needed. The data center operator may own or lease equipment and appropriate rooms for the equipment. However, the data center operator has ultimate responsibility for the physical security of the space and equipment. This responsibility extends to the duty to provide an uncorrupted/valid hypervisor or host operating system on each computer system server or host machine.

By 'secure', it is meant that the data center operator provides physical security to the machines within buildings and enclosures that form the data center. 'Security' means that, although measures can be taken to prevent malicious execution of code, a potential can exist for some new form of trickery to defeat or corrupt one or more parts of the data center. Accordingly, security is more a process of vigilance; threat detection; taking preventative measures, and repeating these steps.

Owners/operators of the data center host virtual machines in a manner that permits a customer to load share data processing tasks among plural virtual machines (or 'VM'). As such, the resources of the data center can appear to a customer to be nearly inexhaustible, which is a property of the environment popularly called 'the cloud'. Cloud computing is described in greater detail in the detailed description, which follows.

In order to rapidly scale a customer's enterprise, a customer may establish a base image for one or more types of node, where the node is an abstraction for processing power offered by underlying physical resources. Security for the operation of these nodes or virtual machines, can be impacted by an invalid or corrupted base operating environment. Alternatively, an invalid or corrupted base image can itself be a source of incorrectly functioning nodes or insecure nodes.

One of the features provided for in a trusted computing environment is obtaining a measurement of the current environment of the computing platform. This measurement includes, at least in part, a cryptographic hash of the firmware and the operating system. The measurement may also include hashes of other software components. The measurement may be used for sealed storage and can also be used for reporting on the environment to an external party. One of the problems with implementing trusted computing is that deployment of applications can involve duplicating an application and its configurations. Duplicating the application and its configurations involves storing the application state to a new computing platform, that may be in an unreliable or unsecure state.

Remedies to the above-noted problems are necessary.

SUMMARY

According to one embodiment of the present invention, a virtual machine provisions from a catalog of stock virtual machines, for example, using a hypervisor executed by the host machine. The host machine instantiates the virtual machine. The host machine configures the virtual machine, to a desired state, wherein the host machine has a trusted platform module. The host machine records a platform configuration state based on the desired state. The host machine forms a sealed blob from a private key and a platform configuration register state. The host machine stores the sealed blob in a data structure.

BRIEF DESCRIPTION OF THE SEVERAL VIEWS OF THE DRAWINGS

FIG. 8 is a flowchart for storing encrypted configured virtual machines in accordance with an illustrative embodiment of the invention; and FIG. 9 is a flowchart for receiving a customer selection corresponding to a stored encrypted configured virtual machine, and conditional execution of the virtual machine on a host machine in accordance with an illustrative embodiment of the invention.

DETAILED DESCRIPTION

Figure 1:
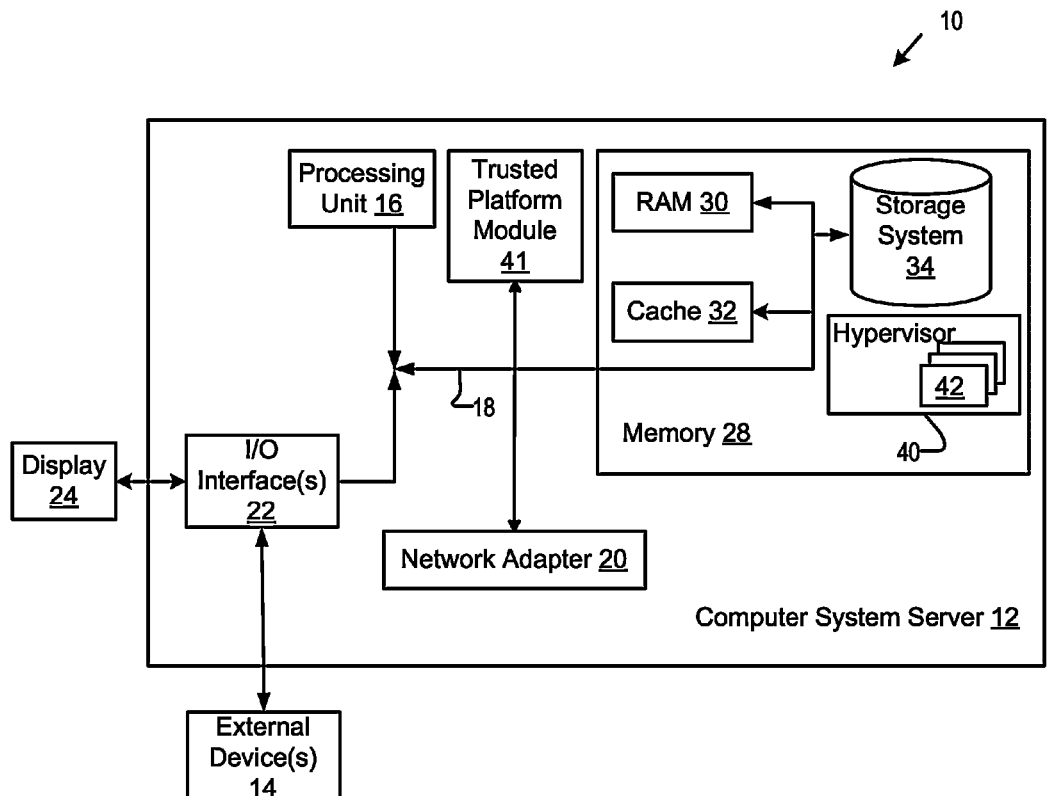
FIG. 1 is a schematic of an example of a server according to an embodiment of the present invention.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of the models are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Referring now to FIG. 1, a schematic of an example of a server in accordance with an illustrative embodiment of the invention. Server 10 can be, for example, implemented as a cloud computing node. Nevertheless, such a node is not intended to suggest any limitation as to the scope of use or functionality of embodiments of the invention described herein. Regardless, server 10 can be implemented and/or perform any of the functionality set forth hereinabove.

In server 10, computer system server 12 operates with numerous other general purpose or special purpose computing system environments or configurations. Examples of well-known computing systems, environments, and/or configurations that may be suitable for use with computer system server 12 include, but are not limited to: personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

Computer system server 12 may be described in the general context of computer system executable instructions, such as program modules, being executed by a computer system. Generally, program modules may include routines, programs, objects, components, logic, data structures, and so on that perform particular tasks or implement particular abstract data types. Computer system server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system server 12 in server 10 is in the form of a general-purpose computing device. The components of computer system server 12 may include, but are not limited to, one or more processors or processing unit 16, a system memory 28, and a bus 18 that couples various system components including system memory 28 to processor 16.

Bus 18 represents one or more of any of several types of bus structures, including a memory bus or memory controller, a peripheral bus, an accelerated graphics port, or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system server 12 typically includes a variety of computer system readable media. Such media may be any media that is accessible by computer system server 12 and includes both volatile and non-volatile media and removable and non-removable media.

System memory 28 can include computer system readable media in the form of volatile memory, such as random access memory (RAM) 30 and/or cache memory 32. Computer system server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each device can be connected to bus 18 by one or more data media interfaces. As will be further depicted and described below, memory 28 may include at least one program product having a set (e.g., at least one) of program modules that are configured to carry out the functions of embodiments of the invention.

Hypervisor 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methods of embodiments of the invention as described herein.

Computer system server 12 may also communicate with one or more external devices 14 such as a keyboard, a pointing device, a display 24, etc.; one or more devices that enable a user to interact with computer system server 12; and/or any devices (e.g., network card, modem, etc.) that enable computer system server 12 to communicate with one or more other computing devices. Such communication can occur via Input/Output (I/O) interfaces 22. In addition, computer system server 12 can communicate with one or more networks such as a local area network (LAN), a general wide area network (WAN), and/or a public network (e.g., the Internet) via network adapter 20. As depicted, network adapter 20 communicates with the other components of computer system server 12 via bus 18. Although not shown, other hardware and/or software components can be used in conjunction with computer system server 12. Examples include, but are not limited to: microcode, device drivers, redundant processing units, external disk drive arrays, RAID systems, tape drives, and data archival storage systems, etc.

Computer system server 12 may establish and detect a trusted platform state of the computer system server. A trusted platform module stores measurement digests of one or more measured components in registers called platform configuration registers (PCR). The trusted platform module (TPM) and platform configuration registers are a components of a trusted computing platform as defined by the Trusted Computing Group. During boot of a trusted computing platform, such as computer system server 12, the root-of-trust component will load a software component, compute the hash of the software component, send the hash to the PCR, and then transfer control to that software component. A software component is a combination of machine instructions executed by at least one processor and associated stored machine instructions as well as supporting data structures. When a software module or software component transfers control, the server's processor may cease or substantially postpone executing further instructions of the calling software, and in response, the processor may execute the instructions of the called software component. The software component may repeat this process with a new software component, and may send the hash of the new software component to a new PCR, or it may extend the hash of a PCR that was previously used. This process may be repeated many times.

Sealed storage is one of the features of a trusted computing platform. The TPM may encrypt a portion of data to form a sealed blob based on PCR values and a secret. Later, when the blob is presented to the TPM for unsealing, the TPM will unseal it, and check whether the PCR values specified in the sealed blob are the same as the PCR values that are currently stored in the PCRs in the TPM. Only if this check passes will the TPM release the decrypted secret to the trusted computing platform. Thus, the sealed secret is only available to the computing environment specified by the sealed blob, through use of the PCR values.

A TPM comprises circuitry included within a processing system to support trusted computing. A TPM has been defined by the Trusted Computing Group (TCG) in the Trusted Computing Platform Association (TCPA) Main Specification 1.2, February 2002, and successive versions, available from the TCG. A TPM operates somewhat like a "smart card" on a motherboard of a computer system (such as a personal computer), to provide various security functions to the system. There is usually only one TPM per computer server. The TPM includes at least one public/private key pair for use in cryptographic operations. In embodiments of the present invention, TPM 41 includes one or more PCRs and a sealed storage function. Each PCR stores data used for controlling and configuring the computer system and may be identified by an identifier. The identifier can be, for example, a number, a text string, and the like. The sealed storage function provides at least encryption and decryption services for the TPM.

Server 10 may have its resources apportioned to one or more logical partitions by hypervisor 40. A hypervisor is a layer of system software that runs on the computer hardware beneath the operating system layer to allow multiple operating systems to run on a host computer at the same time. The hypervisor may be implemented as firmware. The use of a hypervisor permits computer resources to be formed into virtualized counterparts to the physical resources of a computing system.

Figure 2:
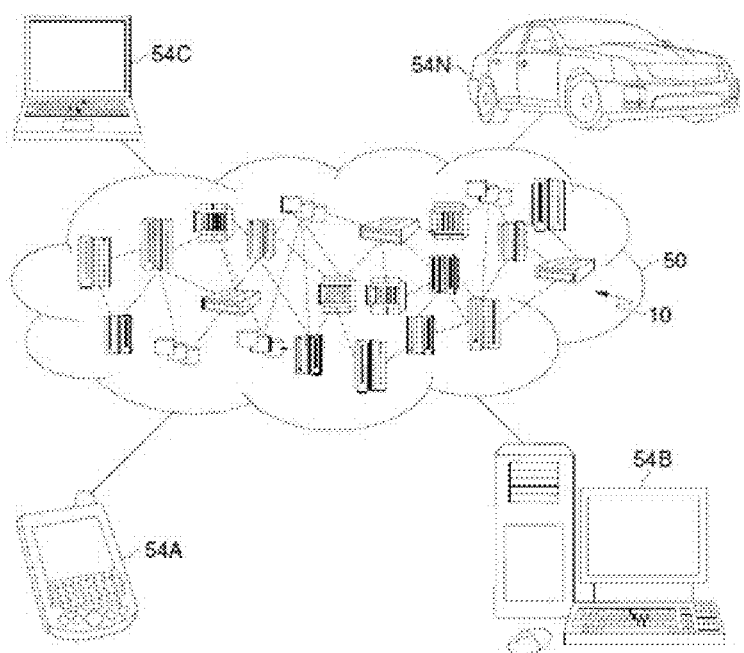
FIG. 2 is a cloud computing environment according to an embodiment of the present invention.

Referring now to FIG. 2, a cloud computing environment is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as private, community, public, or hybrid clouds as described hereinabove, or a combination thereof. This arrangement of nodes allows cloud computing environment 50 to offer infrastructure, platforms and/or software as services for which a cloud consumer does not need to maintain resources on a local computing device. It is understood that the types of computing devices MA-N shown in FIG. 2 are intended to be illustrative only and that computing nodes 10 and cloud computing environment 50 can communicate with any type of computerized device over any type of network and/or network addressable connection (e.g., using a web browser).

Figure 3:
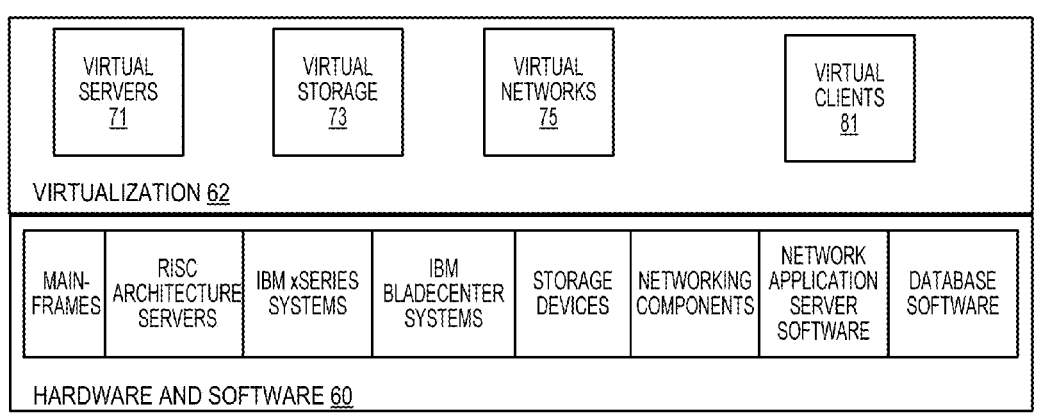
FIG. 3 is a set of functional abstraction layers according to an embodiment of the present invention.

FIG. 3 shows a set of functional abstraction layers provided by cloud computing environment 50 (FIG. 2). The components, layers, and functions in FIG. 3 are intended to be illustrative only and embodiments of the invention are not limited thereto. As depicted, the following layers and corresponding functions are provided.

Hardware and software layer 60 includes hardware and software components. Examples of hardware components include mainframes, for example, IBM® zSeries® systems; RISC (Reduced Instruction Set Computer) architecture based servers; IBM pSeries® systems; IBM xSeries® systems; IBM BladeCenter® systems; storage devices; networks and networking components. Examples of software components include network application server software, IBM WebSphere® application server software; and database software, in one example IBM DB2® database software. IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers 71; virtual storage 73; virtual networks 75, and virtual clients 81.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may permit a user of a data center to confirm validity of a host machine and/or a customer's configured virtual machine so that a host machine, in a correct state, can be coupled to a customer's configured virtual machine, which is also verified and/or validated. Accordingly, a virtual machine's state can be moved, copied, or otherwise paired with a host machine for immediate operation according to the customization of a customer—while obtaining assurances that the host machine, whether original or duplicated, is configured in a known valid state. In other words, the host machine is determined valid based on a determination that the host machine matches a trusted state.

Figure 4:
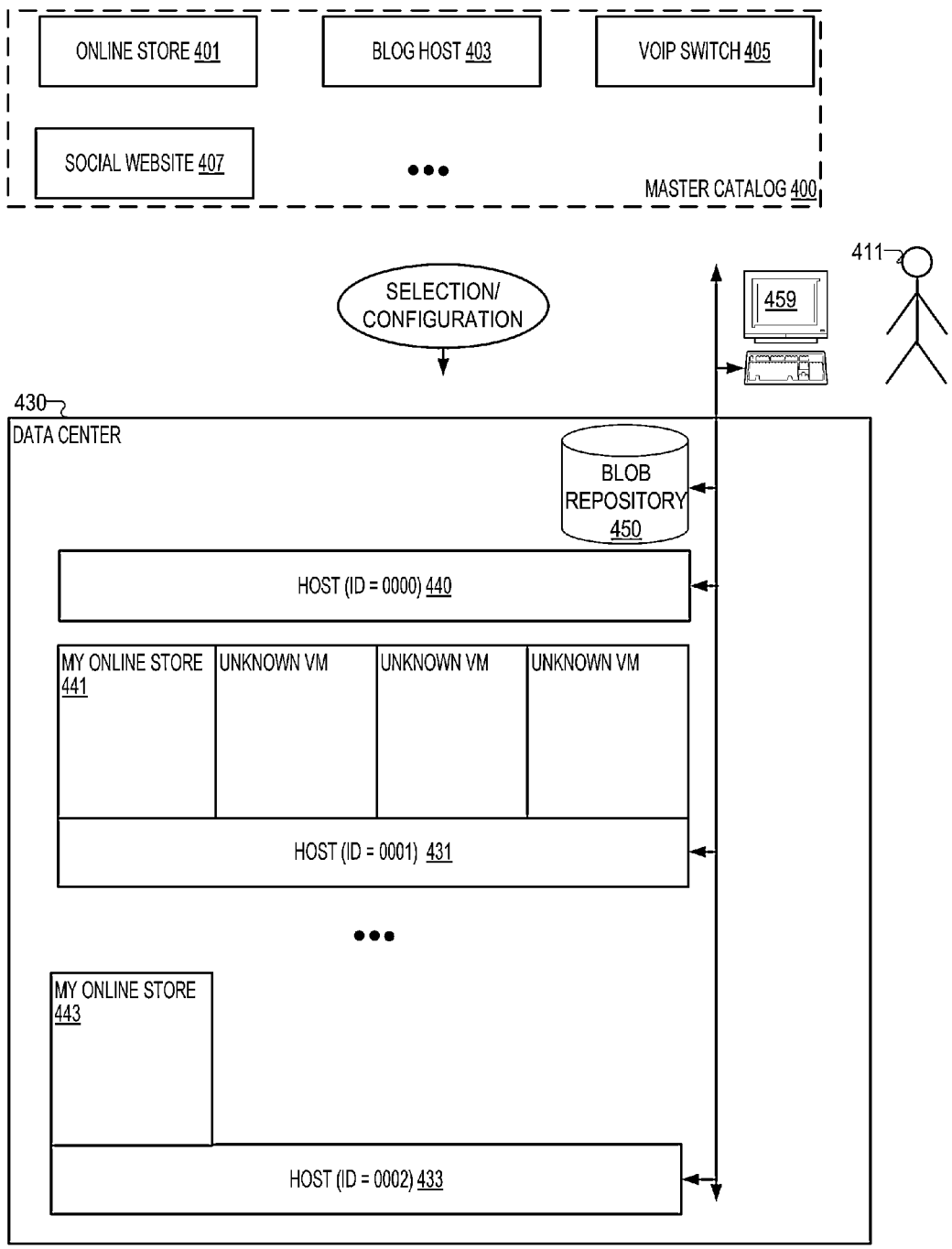
FIG. 4 is an overview of the customer interaction with a cloud computing environment in accordance with an illustrative embodiment of the invention.

FIG. 4 is an overview of the customer interaction with a cloud computing environment in accordance with an illustrative embodiment of the invention. A data center operator may provide master catalog 400 of virtual machine images for the convenience of customer 411. The customer may select a stock virtual machine image, for example, online store 401, blog host 403, VOIP switch 405 and social website 407, via console 459. Later, the customer deploys or instantiates a customized version of the stock virtual machine as my online store 441. The image is executed on host 431, which is identified by a host identifier or physical machine identifier, 0001. A host identifier is a unique identifier for a host within the data center. A data center operator owns and/or controls data center 430, which can house a plurality of hosts. As such, the data center operator may use processing of a host, such as host 440, to carry out housekeeping and logistics of the data center. In other words, host 440 can perform the data center functions described, for example, in the process shown in FIG. 9, below. Such a function can include receiving a customer selection corresponding to a stored encrypted configured virtual machine. As needed, and per security measures described below, the customer may deploy further online stores, such as my online store 443 on host 433. The control of which virtual machine a host may run can be controlled by sealed blobs stored to blob repository 450. A blob repository can be any data structure that stores sealed blobs. A data structure is a way of storing and organizing data in a computer. Sealed blobs can be stored, for example, in a lightweight directory access protocol (LDAP) server. The sealed blobs are explained further below.

Figure 5:
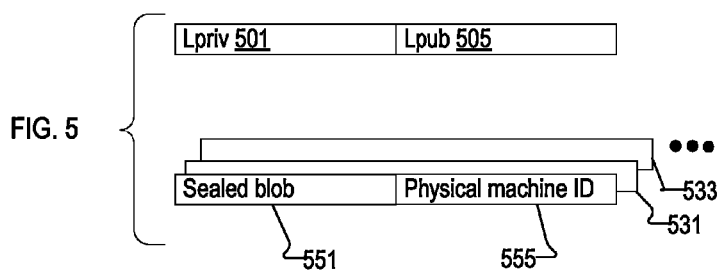
FIG. 5 is a set of data structures used by servers in accordance with an illustrative embodiment of the invention.

FIG. 5 is a set of data structures used by the servers in accordance with an illustrative embodiment of the invention. A data center operator uses an asymmetric key pair comprised of a private key 501 and public key 505. The asymmetric key pair enables the data center operator to unwrap or decrypt a customer's symmetric key. The customer's symmetric key can further be used to decrypt the customer's virtual machine image. For each host where virtual machines will be instantiated, the data center operator's asymmetric key is sealed using the TPM sealing functions to create a sealed blob for that specific host. This sealed blob 551 and identifier 555 (which identifies an associated physical machine) are stored. A sealed blob is a piece of useful data that is made inaccessible to a computer system in a specific state. In other words, the sealed blob can only be accessed on a computer system with a trusted platform state of that corresponds to a time during which the sealed blob was created. Consequently, the sealed blob contains secret data, which the TPM provides as clear text only when the state of the host matches the state used to create the sealed blob. The host and TPM may be computer system server 12 and TPM 41 of FIG. 1, above. A sealed blob is created for each physical machine identifier that is to be able to operate a customer's virtual machine. For example, additional pairings of sealed blobs to associated machine identifiers may be stored as pairs 531 and 533, corresponding to host 431 and 433, respectively, of FIG. 4.

Figure 6:
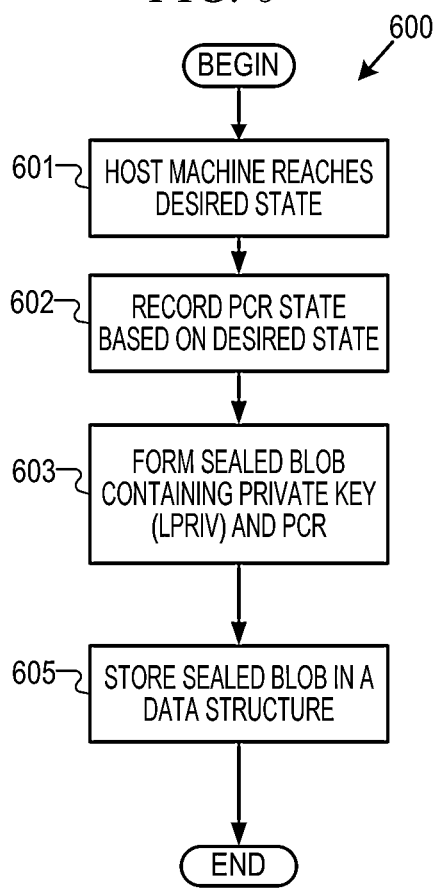
FIG. 6 is a flowchart for creating a sealed blob used to detect consistency of host machines in accordance with an illustrative embodiment of the invention.

FIG. 6 is a flowchart for creating a sealed blob used to detect consistency of host machines in accordance with an illustrative embodiment of the invention. Initially, each host machine reaches a desired state (step 601). Typically, step 601, as well as others in process 600, is performed by each host machine of the data center to configure each host machine accordingly. Each host may perform its respective steps reasonably close in time to the time that the other hosts of the data center perform steps of process 600. A desired state is the set of measurements (PCRs) which represent the host existing in a trusted configuration (as defined by the data center owner). This may be only a subset of the PCR's.

Next, the platform configuration register state is recorded based on the desired state (step 602). In other words, the desired state can be obtained in the platform configuration register state, and that platform configuration register (PCR) state can be recorded to a non-volatile medium. Next, the host machine forms a sealed blob containing the data center owner's private key (lpriv 501), and the platform configuration register state (step 603). Accordingly, the host machine seals the private key, which may be a data center operator's private key, to a host (step 603).

Next, the host machine may store the sealed blob in a data structure (step 605). The data structure may be a database. The database may be comprised of rows that include the sealed blob matched to a physical machine identifier, as shown in FIG. 5. The physical machine identifier is a serial number, universally unique identifier or other unique identifier of the host machine. Processing may terminate thereafter. The steps of process 600 may be performed iteratively on all host machines of the data center. These host machines may include host 431 and host 433 of FIG. 4. Accordingly, for each host machine, the state, as converted into a sealed blob, is recorded in a distinct manner at a time or sealing time. The host machine may be tested later to confirm that the host is again in the same state as when the sealed blob was created.

Figure 7:
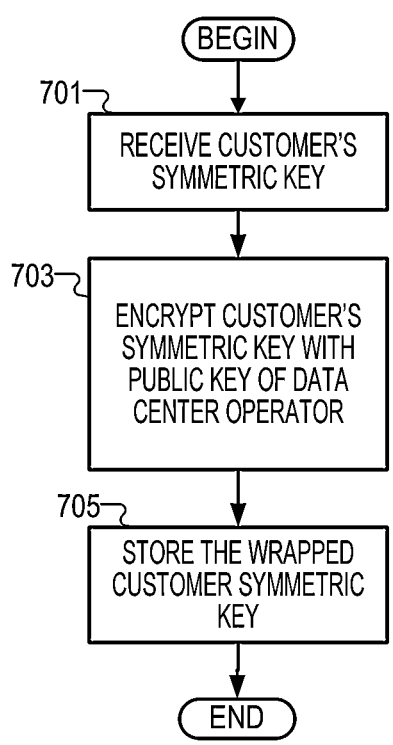
FIG. 7 is a flowchart for creating a customer's encrypted symmetric key in accordance with an illustrative embodiment of the invention.

FIG. 7 is a flowchart for creating a customer's encrypted symmetric key in accordance with an illustrative embodiment of the invention. The steps in FIG. 7 may enable the data center operator to use the customer's symmetric key, when the customer's symmetric key is covered by a suitable encryption. Accordingly, the data center may receive the customer's symmetric key (step 701). The data center may be comprised of multiple host machines that can be configured to operate in cooperation with each other. Next, the data center operator encrypts the customer's symmetric key with a public key of the data center to form a wrapped customer's symmetric key (step 703). The public key corresponds to the private key (lpriv) placed in the sealed blob at step 603, above. A wrapped customer's symmetric key is a symmetric key that is, itself, encrypted in some manner. In other words, the wrapped customer's symmetric key can be useful when the reciprocal decryption algorithm is used to, again, obtain the customer's symmetric key. The reciprocal decryption algorithm is the algorithm that reverses the coding performed by encrypting the customer's symmetric key. As such, only the use of the data center private key can be used to decrypt the customer's symmetric key. Finally, the data center operator may store the wrapped customer's symmetric key (step 705). Processing may terminate thereafter.

FIG. 8 is a flowchart for storing encrypted configured virtual machines in accordance with an illustrative embodiment of the invention. A virtual machine is an isolated abstracted hardware platform that models a real machine which can be emulated through the use of configuration settings. In this environment of physical resources, a physical machine shares its resources between different virtual machines. Isolation means that the operation of a first virtual machine does not interfere with the operation of a second virtual machine that shares resources from a common data processing system. Nevertheless, isolation does not mean that the virtual machines operate on independent power supplies, HVAC systems or are immune to damage caused in a common natural disaster. A virtual machine may be an image stored as the machine instructions stored in non-volatile storage. An image is the collection of instructions to operate a process capable of being executed on a processor. Such an image may result from storing the instructions in series, in other words, as serialized virtual machine. A virtual machine may be a combination of machine instructions stored to volatile storage, including virtualized storage, capable of operating on one or more microprocessors, including virtualized microprocessors. An image or serialized virtual machine can be copied indefinitely and transported across networks to a destination, where the serialized virtual machine can be stored or immediately hosted on a suitable host machine.

Among the uses of a serialized virtual machine are that such serialized virtual machines may be standardized according to well-known operating systems and application configurations. Each such standardized virtual machine may be cataloged for easy selection by a customer who seeks to have a stock or generic functionality when installing the serialized virtual machine to a host in a data processing system. Accordingly, a stock virtual machine is a virtual machine that, when combined to a host, offers a data processing feature desired by a customer or a prospective customer, yet provides such a feature without specific customizations for any particular. In other words, the stock virtual machine may be tersely described in English, and may be offered, sometimes under license, to a customer for selection and eventual instantiation on a host machine.

Accordingly, in initial provision flow 800, a host machine may provision a virtual machine on a host machine from a master catalog of stock virtual machines (step 801). A catalog of stock virtual machines is any repository of stock virtual machines offered to a customer as a base for customer customizations. Next, the host machine may instantiate the virtual machine on the host machine (step 803). The host machine may instantiate in response to the customer's selection of a host machine. As such, the virtual machine so-instantiated can be changed according to the request of a customer received at the host machine. Customization may include configuration of the instance by, for example, the customer opening a command line terminal session to the instantiated virtual machine. As part of the customization, the customer can set internet protocol addresses, user accounts, applicable user privileges and roles, passwords, system tunables, domain names, company names, and any other. Some customizations may be directly entered at the command line of the virtual machine. Some customizations may be entered by revising configuration files. Other customizations may be entered by operation of a user-friendly graphical user interface. The nature and scope of the customization depends on the depth of set-up the customer wants to perform and the types of options available with a given operating system and/or application.

Next, the host machine may configure the virtual machine based on customer inputs to form a customer's configured virtual machine (step 805). A customer's configured virtual machine is an instance of a virtual machine that either executes in a computer system server or is a serialized virtual machine. Customer inputs are the customer inputs delivered as command line instructions, revisions to configuration files inputs at a graphical user interface, and the like.

Next, the host machine may create an image from the customer's configured virtual machine (step 807). An image is a serialized virtual machine. In other words, an image contains the computer instructions and supporting data that permits a machine, that executes the image, to perform a function. Next, the host machine unwraps the sealed customer's symmetric key to form a customer's symmetric key (step 811). Step 811 may be a reciprocal process to step 703, in FIG. 7, above. Next, the host machine encrypts the customer's configured virtual machine with the customer's symmetric key to form an encrypted configured virtual machine (step 813). Steps 811 and 813 may be performed within a hardware security module 825. In addition, the host machine stores the encrypted configured virtual machine image, which results from step 813, to non-volatile storage (step 821). The host machine can perform this step, for example, by writing the encrypted configured virtual machine to a disk. Non-volatile storage is storage that retains data regardless of the application of electrical power to the storage device. In other words, data can be read from the storage device even after the storage device has had substantially all charge dissipate from circuits of the device. Processing may terminate thereafter.

Accordingly, the customer can create, through the processing of the host machine, a configured virtual machine that is resistant to reading, in clear text, its content.

FIG. 9 is a flowchart for receiving a customer selection corresponding to a stored encrypted configured virtual machine, and conditional execution of the virtual machine on a host machine in accordance with an illustrative embodiment of the invention. Process 900 can permit a customer to use selected images for copying virtual machines to operate in a data center having a plurality of computer system servers that are in a known or trusted state. Initially, the data center may receive a customer selection of an encrypted configured virtual machine image (step 901). An encrypted configured virtual machine image is an image of a virtual machine stored in a form configured according to a customer's preferences, which is encrypted prior to storage. The encrypted configured virtual machine image may be the same encrypted configured virtual machine image stored in step 821 of FIG. 8. The customer selection may be a customer's name previously given to the encrypted configured virtual machine image concurrently with the customer creating the encrypted configured virtual machine image. Accordingly, the customer may enter the name of an encrypted configured virtual machine image at a suitable prompt from the data center. Alternatively, the customer may select an encrypted configured virtual machine image from among a list of descriptions given by the customer for previously-created encrypted configured virtual machine images. Still further, the customer can select from any other form of indicia used to uniquely distinguish the encrypted configured virtual machine image from among a set of encrypted configured virtual machine images.

Next, the data center may obtain a sealed blob from a data structure controlled by the data center (step 903). The sealed blob seals the asymmetric private key used to wrap the customer's symmetric key of FIG. 7. Thus, next, the data center may unseal the sealed blob to form the data center private key (step 904). This step may be performed if the host system's state matches the state in PCRs used to create the sealed blob. Next, the data center uses the data center private key to unwrap the customer's symmetric key (step 905). Next, the data center may decrypt a customer's configured virtual machine (step 907). The customer's configured virtual machine may correspond to a customer selection of a customer's configured virtual machine. In other words, step 907 may be responsive to step 901. An outcome of step 907 can be success or failure. The host determines if the decryption was a success (step 909). Thus, the data center, in response to successful decryption, may form the customer's configured virtual machine. In response to decrypting the customer's configured virtual machine, the data center executes the customer's configured virtual machine on a host processor of a host machine (step 911). A host processor can be, for example, processing unit 16 of FIG. 1. Alternatively, a negative result at step 909 can result in the host reporting failure (step 913). Processing terminates thereafter.

Thus, one or more illustrative embodiments may permit a customer to scale the number of virtual machines that execute a particular virtual machine image in any data center while allowing the customer to know with reasonable assurance that a) the customer's configured virtual machine is uncorrupted; and b) the corresponding host machine is in a correct state. The failure to unseal the private key means that the host is not in the proper state to unseal. In other words, the host is in an untrusted state. Accordingly, a host in an untrusted stated can be reported in a failure report.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the various embodiments of the present invention have been presented for purposes of illustration, and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand contemplated embodiments disclosed herein.

What is claimed is:

1. A method for storing a customized virtual machine, the method comprising:
configuring a host machine to a desired state, wherein the host machine has a trusted platform module;
recording a platform configuration register state based on the desired state;
forming a sealed blob from a private key and a platform configuration register state to verify whether the virtual machine can be executed;
receiving a customer's symmetric key at a data center;
encrypting the customer's symmetric key with a public key of the data center to form a wrapped customer's symmetric key;
storing the wrapped customer's symmetric key;
provisioning a virtual machine on the host machine, wherein the virtual machine is selected from a catalog of stock virtual machines;
instantiating the virtual machine on the host machine;
configuring the virtual machine, based on customer inputs, to form a customer's configured virtual machine;
creating an image from the customer's configured virtual machine;
unwrapping the wrapped customer's symmetric key to form a copy of the customer's symmetric key;
encrypting the customer's configured virtual machine with the copy of the customer's symmetric key to form an encrypted configured virtual machine; and
storing the encrypted configured virtual machine to non-volatile storage.

2. The method of claim 1, wherein the method is stored as computer-readable program instructions in one or more computer-readable, tangible storage devices and
wherein computer-readable program instructions can be executed by one or more processors.

3. The method of claim 1, wherein the method is executed in a computer system comprising one or more processors, one or more computer-readable memories, one or more computer-readable, tangible storage devices and
wherein the method is stored as computer-readable program instructions, which can be executed by the one or more processors via the one or more memories.

4. A method for executing a customer's configured virtual machine, the method comprising:
configuring a host machine to a desired state, wherein the host machine has a trusted platform module;
recording a platform configuration register state based on the desired state;
forming a sealed blob from a private key and a platform configuration register state;
receiving a customer selection of an encrypted configured virtual machine image;
obtaining the sealed blob from a data structure controlled by a data center;
unsealing the sealed blob to form a data center private key, wherein unsealing further comprises:
determining whether the host machine has the current trusted platform state to match a first trusted platform state of the host machine, and in response, decrypting a customer's symmetric key with the data center private key, wherein the first trusted platform state of the host machine corresponds to a time during which the sealed blob was created;
decrypting the customer's configured virtual machine from the encrypted configured virtual machine; and
executing the customer's configured virtual machine on a host processor of the host machine.

5. The method of claim 4, wherein the private key is created by a data center operator.

6. The method of claim 4, wherein the private key is stored in a hardware security module.

7. The method of claim 4, further comprising:
storing the sealed blob in the data structure, wherein storing the sealed blob further comprises sending the sealed blob to a second host machine owned by a data center operator; and
repeatedly performing the configuring, the recording, the forming and the storing for each host among a plurality of hosts to form a sealed blob per each host among the plurality of hosts, wherein each sealed blob corresponds to a host identifier, one corresponding to each host, and each sealed blob is stored in association with each host identifier.

8. The method of claim 7, wherein storing further comprises:
obtaining the private key by unsealing the private key from a sealed blob using a trusted platform module platform configuration register (PCR).

9. The method of claim 4, wherein the data structure is stored in a lightweight directory access protocol (LDAP) server.

10. The method of claim 9, wherein the data structure comprises a database.

11. The method of claim 4, wherein the encrypted configured virtual machine image is an image of a virtual machine stored in a form configured according to a customer's preferences, which is encrypted prior to storage.

12. The method of claim 4, wherein the method is stored as computer-readable program instructions in one or more computer-readable, tangible storage devices and
computer-readable program instructions, which are stored on the one or more storage devices and when executed by one or more processors, perform the method of claim 4.

13. The method of claim 4, wherein the method is executed in a computer system comprising one or more processors, one or more computer-readable memories, one or more computer-readable, tangible storage devices and wherein the method is stored as
computer-readable program instructions, which can be executed by the one or more processors via the one or more memories.

* * * * *